United States Patent
Burg et al.

(10) Patent No.: US 6,887,062 B1
(45) Date of Patent: May 3, 2005

(54) EXTRUDER SCREW TIP AND ASSOCIATED FLOW CHANNEL

(75) Inventors: Gary Robert Burg, Massillon, OH (US); Malcolm George Marshall, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/857,552

(22) PCT Filed: Dec. 1, 1999

(86) PCT No.: PCT/US99/00653

§ 371 (c)(1),
(2), (4) Date: Jun. 5, 2001

(87) PCT Pub. No.: WO00/41871

PCT Pub. Date: Jul. 20, 2000

(51) Int. Cl.⁷ .............................................. B29C 47/60
(52) U.S. Cl. ..................... 425/209; 264/211.21; 366/89
(58) Field of Search ..................... 264/211.21; 425/208, 425/209; 366/89, 81, 78

(56) References Cited

U.S. PATENT DOCUMENTS

| | | | |
|---|---|---|---|
| 3,445,890 A | * 5/1969 | McCormick et al. ....... 425/209 |
| 3,565,403 A | 2/1971 | Matsuoka ....................... 259/6 |
| 3,846,057 A | 11/1974 | Counceller et al. .......... 425/207 |
| 4,173,445 A | * 11/1979 | McKelvey et al. ....... 425/382.4 |
| 4,749,279 A | * 6/1988 | Csongor ....................... 366/80 |
| 4,981,364 A | * 1/1991 | Geyer .......................... 366/81 |
| 5,145,352 A | 9/1992 | Capelle et al. .............. 425/205 |
| 5,439,633 A | 8/1995 | Durina et al. .......... 264/328.17 |
| 5,599,096 A | * 2/1997 | Rog ............................. 366/78 |
| 5,660,864 A | 8/1997 | Schmidhalter .............. 425/145 |
| 6,454,454 B1 | * 9/2002 | Barr ............................ 366/78 |
| 6,547,431 B1 | * 4/2003 | Womer ........................ 366/81 |

* cited by examiner

Primary Examiner—Michael P. Colaianni
Assistant Examiner—Monica A. Fontaine
(74) Attorney, Agent, or Firm—Brouse McDowell; Roger D. Emerson; Heather M. Barnes

(57) ABSTRACT

A screw nose for a rubber extruder screw has an upstream portion of increasing diameter providing working engagement of the rubber flowing from the screw with the extruder barrel and a downstream portion of decreasing diameter providing working engagement of the rubber with a converging tapered wall of a flow channel block for reducing the shrinkage and pressure drop at the discharge end of the screw and thereby prevent porosity and blisters in an extruded rubber component.

6 Claims, 3 Drawing Sheets

EXTRUDER SCREW TIP AND ASSOCIATED FLOW CHANNEL

TECHNICAL FIELD

This invention is directed to methods and apparatus for use with the extrusion of visco-elastomeric material, and more specifically, to the prevention of porosity in an extrudate.

BACKGROUND ART

It is well known in the art to extrude visco-elastic materials, such as rubber, using a screw extruder and a flow channel head for communicating the rubber through a flow channel from the extruder to a die. At the discharge end of the extruder the visco-elastic material flows over a screw nose into a receiving end of the flow channel. One problem known in the art, for example, in the rubber industry, is porosity, or the formation of bubbles in the material at the discharge end of the extruder where the screw flights terminate. The bubbles are carried in the material through the flow channel and show up as blisters, or porosity in the resulting rubber component after leaving the die.

It is believed the bubbles are formed in the space at the discharge end of the screw flights, because the bubbles show up at positions corresponding to the positions of the screw flights. The bubbles are also believed to result from shrinkage, or the tendency of visco-elastic material to revert to the molecular state of the material prior to the extrusion process, otherwise known as "memory." When the material is being extruded it is stretched, and when the stretching stops, or is decreased, the material will tend to shrink. This reduction in pressure on the material is believed to cause the volatiles in the material to expand and produce bubbles. In the present invention, an enlarged screw nose is provided for preventing this creation of porosity in the extrudate.

Examples of extruders having enlarged screw noses are U.S. Pat. No. 4,357,291, which shows a conventional mixing section 26 for an extruder of the type used for extruding ethylene polymers. U.S. Pat. No. 5,660,864 shows a bullet nose at the end of a screw section of an injection piston for injection molding of glass fiber reinforced polyester material. U.S. Pat. No. 3,846,057 is directed to a reciprocating screw extruder for injection molding of rubber which has a head on the forward end of the screw cooperating with a check ring preventing back flow of the rubber during the injection process. In none of these patents is there a description or showing of an extruder screw with an enlarged screw nose having a conical surface for preventing porosity in the extrudate.

DISCLOSURE OF INVENTION

In accordance with one aspect of the invention, there is provided a screw nose for a discharge end of an extruder having a screw with at least two helical flights rotatable in a cylindrical barrel characterized by the screw nose having an upstream portion of increasing diameter, providing a generally conical surface for decreasing the transition space between the screw nose and the barrel and maintaining pressure on the extrudate at the discharge end.

In accordance with another aspect of the invention, there is provided a method of extruding a shaped rubber component, comprising:

(a) feeding rubber into a cylindrical extruder barrel at a feed end of the extruder, (b) rotating a screw in said barrel to mix and convey the rubber to a discharge end, characterized by, (c) restricting the space for the flow of the rubber with a screw nose having an upstream portion of increasing diameter, providing a generally conical surface.

DETAILED DESCRIPTION OF THE INVENTION

Figure 1:
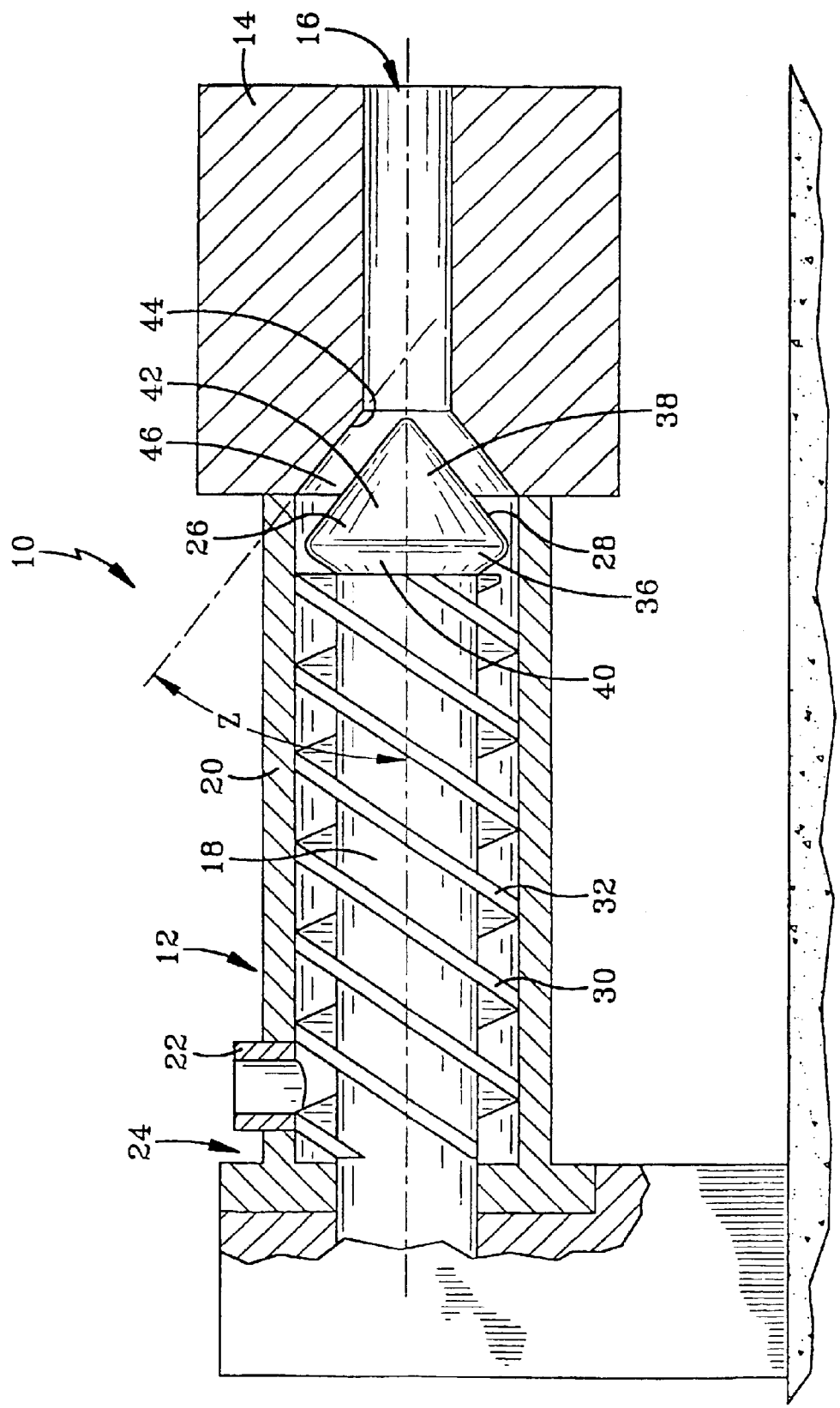
FIG. 1 is a schematic cutaway view of an extruder and flow head embodying the invention.

Referring to FIG. 1, an extruder-flow head assembly 10 is shown having an extruder 12 connected toga flow head 14 with a flow channel 16 leading to a die (not shown) for forming a component of visco-elastic material, such as rubber.

The extruder 12 has a screw 18 rotatable in a cylindrical barrel 20 with a feed opening 22 at an entrance end 24 of the extruder. A screw nose 26 is provided at a discharge end 28 of the extruder 12. The screw 18 preferably has at least two helical screw flights 30 and 32 and may be rotated by power means, such as a motor (not shown).

Figure 2:
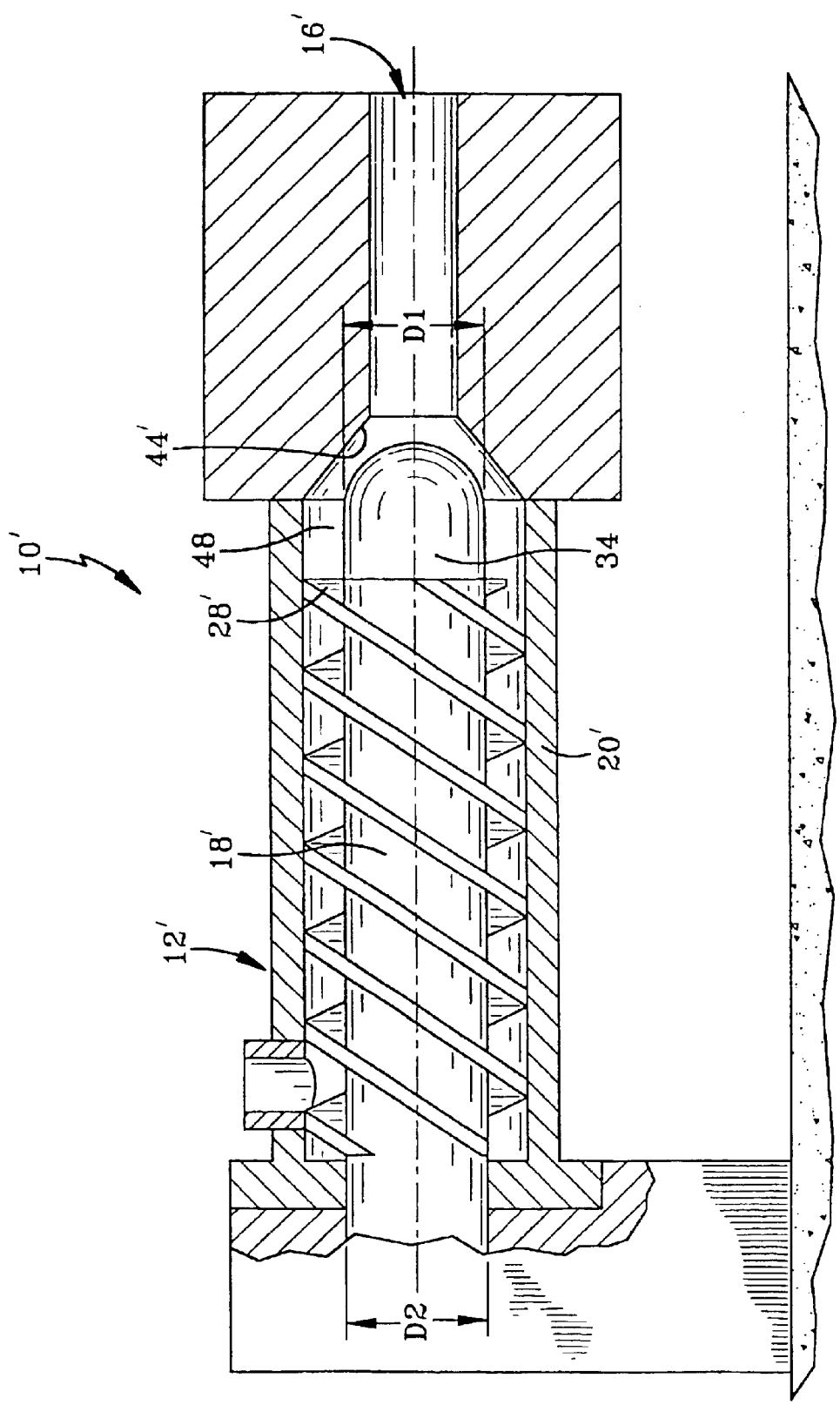
FIG. 2 is a view like FIG. 1 of an extruder and flow head according to the prior art.

Referring to FIG. 2, a prior art extruder 12' has similar parts to the extruder-flow head assembly 10 of the invention shown in FIG. 1, and the numerals for these parts are designated by the addition of a prime mark. In the prior art extruder 12' the screw nose 34 has a bullet shape with a diameter D1 which may be the same as the root diameter D2 of the screw 18'.

Figure 3:
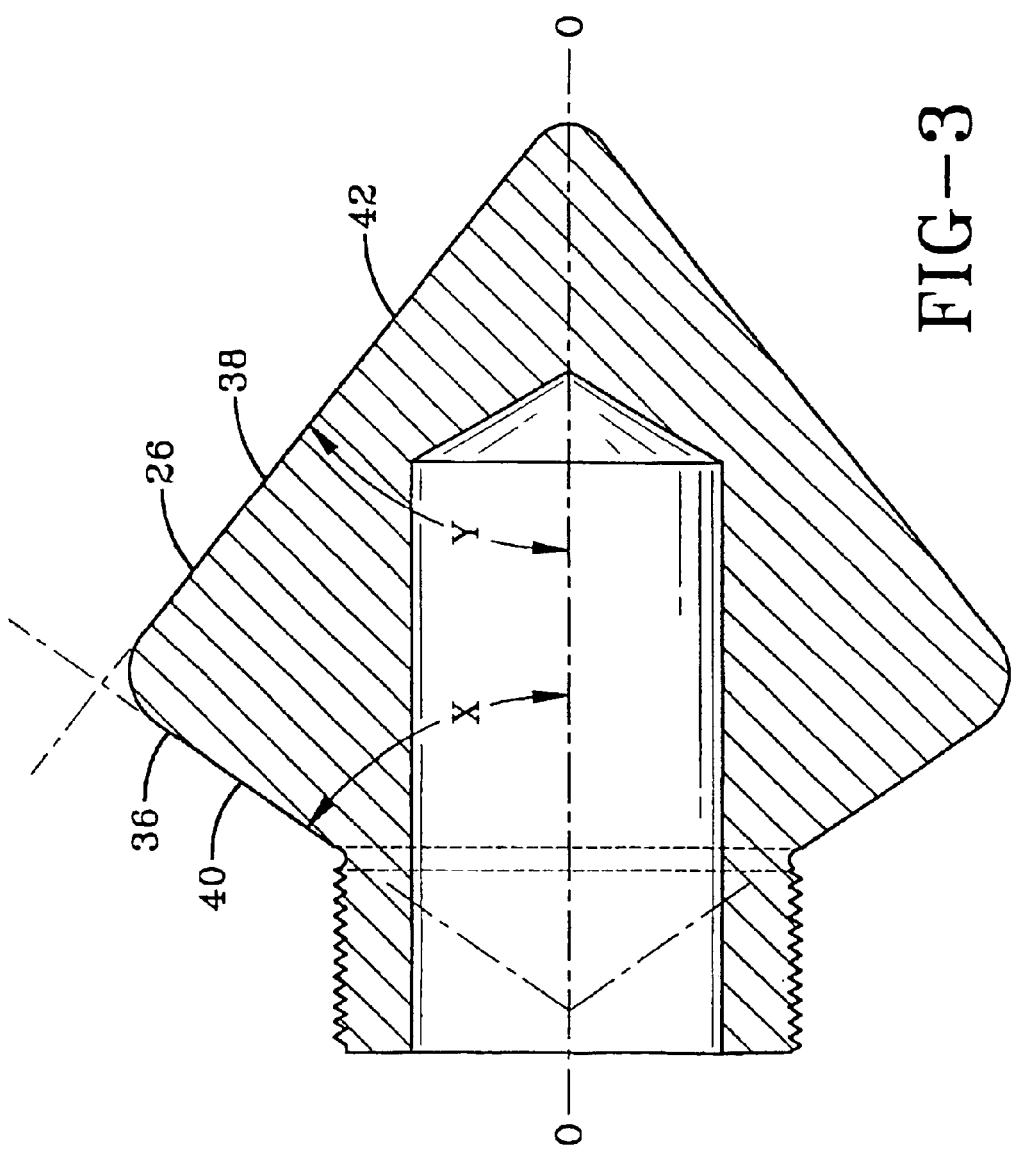
FIG. 3 is a cross section of the screw nose of the extruder screw shown in FIG. 1.

Referring again to FIG. 1 and to FIG. 3, the screw nose 26 embodying the invention has an upstream portion 36 and a downstream portion 38. The upstream portion 36 has an increasing diameter in the direction of the flow of the rubber providing a generally conical upstream surface 40. The downstream portion 38 of the screw nose 26 has a decreasing diameter in the direction of the flow providing a generally conical downstream surface 42 which is spaced from a tapered wall 44 of decreasing diameter of the flow channel head 14 in the direction of the flow. Preferably the generally conical upstream surface 40 is inclined at an angle X of 55 degrees to an axis 0—0 of the screw nose and may be inclined from 45 degrees to 65 degrees. The generally conical downstream surface 42 is inclined to the axis 0—0 at an angle Y of 40 degrees and may be inclined from 35 degrees to 45 degrees, depending on the angle Z, that the tapered wall 44 is inclined to the axes 0—0. Preferably the angle Y is equal to the angle Z.

A transition space 46 is defined by the conical surface 42 of the downstream portion 38, the conical surface 40 of the upstream portion 36, a tapered wall 44 of the flow head channel 14 and the cylindrical barrel 20 of the extruder 12 as shown in FIG. 1. In the prior art extruder 12', the transition space 48 is defined by the cylindrical bullet nose screw nose 34, the tapered wall 44' of the flow channel head 14' and the cylindrical barrel 20'.

In operation of the extruder embodying the invention, a visco-elastic material, such as rubber, is fed into the extruder 12 through the feed opening 22 and the screw flights 30 and 32 propel the rubber toward the discharge end 28 of the extruder 12. As the screw 18 is rotated, the screw flights 30 and 32 and the cylindrical barrel 20 are in working engagement with the rubber, which is pulled and stretched in tension as it is moved from the feed opening 22 to the discharge end 28 of the extruder. This working increases the pressure on the rubber and raises the temperature.

In the prior art extruder shown in FIG. 2, the working engagement, including the stretching and mixing of the rubber is substantially reduced at the discharge end 28' where the rubber is moved into an enlarged transition space 48 and past the screw nose 34 which has a configuration of a bullet with a diameter D-1 substantially the same as the root diameter D2 of the screw 18'. The pressure on the rubber in the enlarged transition space 48 is reduced where it is believed volatiles in the rubber expand and cause bubbles. The rubber then flows through the flow channel 16' to a die (not shown). The shaped rubber material is then exposed to the atmosphere where it is believed porosity and blisters in the surface of the extruded material are formed.

With the apparatus of this invention shown in FIGS. 1 and 3, the screw nose 26 has an upstream portion 36 with a conical surface of increasing diameter in the direction of the flow for engaging the rubber flowing from the helical screw flights 30 and 32 and urging the rubber into working engagement with the wall of the cylindrical barrel 20. This working engagement maintains the pressure on the rubber and prevents expansion of the volatiles in the rubber. After passing over the conical surface 42 of the upstream portion 36 of the screw nose 26, the rubber flows over the downstream portion 38 which has a decreasing diameter in the direction of flow with a surface 42 at the angle Y, in substantially parallel relation to the tapered surface 44 of the flow channel head 14 which is inclined at an angle Z relative to the axis 0—0 of the screw nose. With this configuration the rubber is confined to the space between the tapered surface 44 and the conical surface 42 and maintained in working engagement with these surfaces 44 and 42 of the tapered wall and upstream surface, thereby maintaining pressure on the rubber and preventing the formation of bubbles by expansion of the volatiles in the rubber material. The rubber material then flows through the flow channel 16 of the flow head 14 which has a generally constant sectional area to a die (not shown) where it is formed in the final shape without expansion of the volatiles, providing a bubble free, smooth surfaced extrudate.

While a certain representative embodiment have been shown for the purpose of illustrating the invention, it will be apparent to those skilled in the art that various changes and modifications may be made therein without departing from the scope of the invention.

Having thus described the invention; it is now claimed:

1. An extruder screw and flow channel head assembly comprising an extruder having a cylindrical barrel with a feed end and a discharge end, said discharge end being attached to a flow channel head containing a flow channel for carrying rubber from said extruder to a suitable die, a screw nose on said extruder screw positioned in a transition space at said discharge end of said barrel wherein said screw nose has a radially expanding upstream portion providing a conical surface of increasing diameter in the direction of flow of said rubber for maintaining said rubber in working engagement with said screw nose and the cylinder wall of said cylindrical barrel, whereby the pressure on said rubber is maintained in said transition space, said cylindrical barrel having a constant diameter, wherein said screw and screw nose rotate about a central axis without reciprocating movement in said cylindrical barrel as it moves said rubber from said feed end to said discharge end, further characterized by said screw nose having a downstream portion with a conical surface of decreasing diameter in the direction of flow of said rubber spaced from an opposing tapered wall of said flow channel head for maintaining working engagement of said rubber with said conical surface of said screw nose and said tapered wall of said flow channel whereby pressure on said rubber is maintained to prevent expansion of volatiles in said rubber.

2. An extruder screw and flow channel head assembly according to claim 1, further characterized by said flow channel having a generally constant cross sectional area from said tapered wall of said flow channel head to a discharge end of said flow channel head to maintain for maintaining pressure on said rubber and for providing time for volatiles in said material to be dissolved before ejection from said flow channel head.

3. The extruder screw and flow channel head assembly according to claim 1 further characterized by said upstream portion of said extruder screw nose of increasing diameter has a conical surface disposed at an angle of 45 degrees to 65 degrees relative to the axis of said screw nose.

4. The extruder screw and flow channel head assembly of claim 3 further characterized by said angle of said conical surface of said upstream portion being about 50 degrees.

5. The extruder screw and flow channel head assembly according to claim 1 further characterized by said generally conical surface of said downstream portion being at an angle of 35 degrees to 45 degrees relative to the axis of said screw nose.

6. The extruder screw and flow channel head assembly of claim 5 further characterized by said angle of said generally conical surface of said downstream portion being at an angle of about 40 degrees.

* * * * *